(12) United States Patent
Chen

(10) Patent No.: US 6,990,516 B2
(45) Date of Patent: Jan. 24, 2006

(54) DISTRIBUTED SHARED MEMORY SYSTEM AND DATA-MAINTENANCE METHOD OF SAME

(75) Inventor: Wei-Long Chen, Rochester, MN (US)

(73) Assignee: Via Technologies, Inc., Shindian (TW)

( * ) Notice: Subject to any disclaimer, the term of this patent is extended or adjusted under 35 U.S.C. 154(b) by 0 days.

(21) Appl. No.: 10/409,937

(22) Filed: Apr. 9, 2003

(65) Prior Publication Data

US 2003/0189944 A1 Oct. 9, 2003

Related U.S. Application Data

(60) Provisional application No. 60/371,194, filed on Apr. 9, 2002.

(51) Int. Cl.
*G06F 13/14* (2006.01)

(52) U.S. Cl. ..................................... 709/217
(58) Field of Classification Search ............... 709/213, 709/217, 218, 219
See application file for complete search history.

(56) References Cited

U.S. PATENT DOCUMENTS

| 6,014,690 | A | * | 1/2000 | VanDoren et al. | 709/215 |
| 6,654,866 | B2 | * | 11/2003 | Hagersten et al. | 711/205 |
| 6,751,698 | B1 | * | 6/2004 | Deneroff et al. | 710/317 |

FOREIGN PATENT DOCUMENTS

WO     WO 01/67273 A2     9/2001

* cited by examiner

*Primary Examiner*—Kevin L. Ellis
(74) *Attorney, Agent, or Firm*—Volpe and Koenig P.C.

(57) ABSTRACT

A distributed shared memory (DSM) system includes a first and a second nodes. The first node includes a first system bus; at least one first processor electrically connected to the first system bus; a first memory control chip electrically connected to the at least one first processor via the first system bus; a first local memory electrically connected to the first memory control chip and including a plurality of first local memory lines for separately storing data; and a first DSM controller electrically connected to the first system bus and the first memory control chip, and directly coupled to a second DSM controller of the second node via a bus line.

19 Claims, 5 Drawing Sheets

DISTRIBUTED SHARED MEMORY SYSTEM AND DATA-MAINTENANCE METHOD OF SAME

CROSS REFERENCE TO RELATED PATENT APPLICATION

This patent application is based on a U.S. provisional patent application No. 60/371,194 filed Apr. 9, 2002.

FIELD OF THE INVENTION

The present invention relates to a distributed shared memory (DSM) architecture in a multi-processor system, and more particular to a distributed shared memory architecture in which a remote node accesses a local memory by using the distributed shared memory system. The present invention also relates to a data-maintenance method of a DSM system.

BACKGROUND OF THE INVENTION

Due to the increasing advance of science and technology, digitized information processing means plays a more and more important role on our daily lives and business activities. Consequently, the data processing amount is too huge to be operated by using a simple data processing device, such as a computer system with a single processor and a local memory. In order to efficiently deal with a large quantity of data, a multi-processor system is developed to solve this problem.

So far, two types of parallel data-processing systems have been used. One is the tightly coupled parallel data-processing system, and the other is loosely coupled parallel data-processing system.

The tightly coupled parallel data-processing system includes a plurality of central processing units (CPUs) and a memory accessible by all the CPUs. This architecture is extended from a single-CPU system so as to have a relatively simple design. Such system, however, has an inherent limit. Since the plurality of CPUs access the memory via a single common bus, the overall scale of the system cannot be too large. Aside from, the large number of CPUs will load heavy burden on the bus.

On the other hand, the loosely coupled parallel data-processing system is a system consisting of a plurality of computers interconnected via a high-speed network. Via a delicately designed topological architecture, the loosely coupled parallel data-processing system can be quite expansible, compared to the tightly coupled parallel data-processing system. In other words, a large number of processors can be included in the system. Since the communication of the entire system is conducted via network, the complexity of the architecture would be much more difficult than the tightly coupled parallel data-processing system in order to achieve high performance.

In order to solve the problems of the above systems, a processing system involving a distributed shared memory (DSM) is developed for parallel data-processing and rapid data-sharing purpose for a remote node to access a local memory. The DSM system has the advantages of both of the tightly and loosely coupled parallel data-processing systems. That is, the DSM system is simple and expansible. Since 1980, a plurality of DSM systems have been practiced. One of the examples is the cache coherency non-uniform memory access (ccNUMA) architecture.

Figure 1:
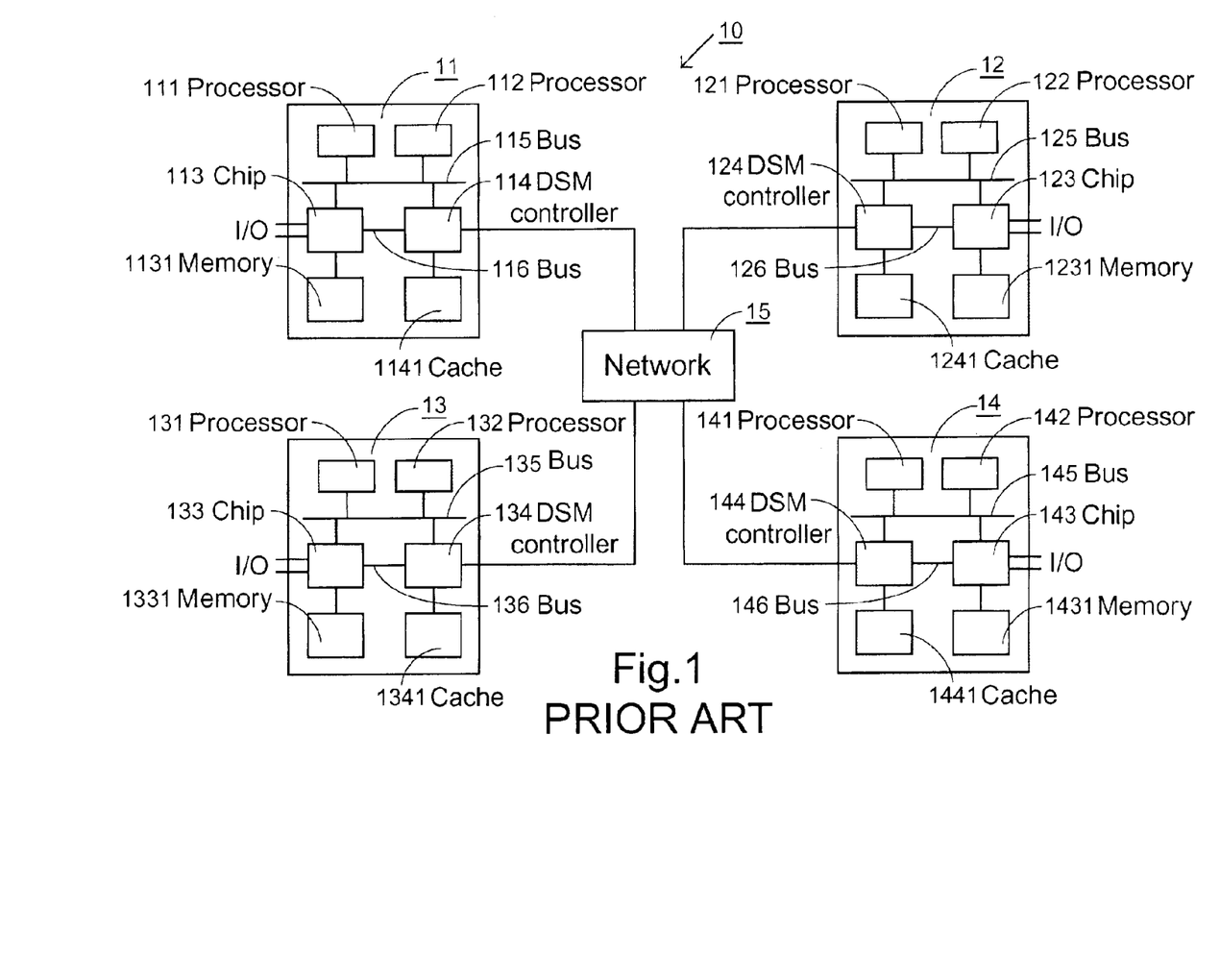
FIG. 1 is a block diagram showing a conventional distributed shared memory (DSM) system.

Please refer to FIG. 1, which is a block diagram illustrating a conventional ccNUMA-type DSM system. The DSM system 10 includes four nodes 11~14 interconnected by a network 15. The nodes 11~14, as shown, include respective processors 111, 112, 121, 122, 131, 132, 141, 142, memory control chips 113, 123, 133, 143 for I/O control, local memories 1131, 1231, 1331, 1431, DSM controllers 114, 124, 134, 144, external caches or L3 caches 1141, 1241, 1341, 1441, system buses 115, 125, 135, 145, and internal buses 116, 126, 136, 146. Each of the local memories 1131, 1231, 1331, 1431 is divided into a plurality of local memory lines for separately storing data. Likewise, each of the caches 1141, 1241, 1341, 1441 is divided into a plurality of cache lines for separately storing cache data.

Each of the DSM controllers 114, 124, 134, 144 maintains a memory coherency directory stored therein (not shown) in order to realize the states of all the local memory lines. When any of the nodes is going to read data from a specific local memory line, the reading operation is guided by the DSM controller according to the memory coherency directory. The DSM controller also maintains a cache coherency directory stored therein (not shown) in order to realize the states of all the cache lines. When any of the nodes is going to read data from a specific cache line, the reading operation is guided by the DSM controller according to the cache coherency directory.

Since the DSM controllers of all nodes communicate with one another via the network 15, a network communication protocol such as TCP/IP would be used as the data transmission format for inter-communication. As is known to those skilled in the art, such communication protocol is complex and inefficient. For a DSM system consists of two nodes only, the communication complexity and performance are even adverse.

SUMMARY OF THE INVENTION

Therefore, an object of the present invention is to provide a DSM system, two nodes of which are interconnected via a circuit rather than a network so as to simplify the communication complexity on the condition that the data in all nodes can be properly maintained.

Additionally, L3 caches can be omitted from the DSM system of the present invention.

A first aspect of the present invention relates to a DSM system including a first and a second nodes. Each of the first and second nodes comprises a system bus; at least one processor electrically connected to the system bus; a memory control chip electrically connected to the at least one processor via the system bus; a local memory electrically connected to the memory control chip and including a plurality of local memory lines for separately storing data; and a first DSM controller electrically connected to the system bus and the memory control chip, and directly coupled to a second DSM controller of the second node via a bus line.

When a latest data is required by the second node, and the latest data is stored in the local memory of the first node, the first DSM controller of the first node requests the latest data from a specific one of the first local memory lines via an first internal bus, and transfers the latest data to the second DSM controller of the second node via the bus line. Preferably, a data transmission format of the bus line is identical to that of the first internal bus.

When a latest data is required by the second node, and the latest data is stored in a cache of the processor of the first node, the first DSM controller of the first node requests the latest data via the first system bus by asserting a system bus transaction signal. Preferably, the first DSM controller of the first node transfers the latest data to the second DSM controller of the second node via the bus line.

A second aspect of the present invention relates to a data-maintenance method of a distributed shared memory (DSM) system including a first and a second nodes. The method comprises steps of: determining a position of a latest data in the first node, which is required by the second node; and transferring the latest data from the first node to the second node via a bus line only when the position of the latest data is determined.

For example, the position of the latest data is determined by referring to a memory coherency directory.

In an embodiment, the latest data is transferred from the first node to the bus line via an internal bus in a specific data transmission format and further to the second node via the bus line in the same specific data transmission format when the latest data required by the second node is determined to be stored in a local memory of the first node.

In another embodiment, the latest data is transferred from the first node to the bus line via a system bus in a specific data transmission format and further to the second node via the bus line in the same specific data transmission format when the latest data required by the second node is determined to be stored in a cache of a processor of the first node. The latest data is transferred from the first node to the system bus in response to a system bus transaction signal.

A third aspect of the present invention relates to a data-maintenance method of a distributed shared memory (DSM) system. The DSM system comprises a first and a second nodes which optionally request to read data from each other. The method comprises steps of: determining whether a latest version of a data from a specific local memory line is in a local memory of the first node when the second node requests to read that data; and requesting the latest version of the data via an internal bus of the first node, and transferring the latest version of the data from the first node to the second node via a bus line directly connecting the first and the second nodes, when the latest version of the data is in the local memory of the first node.

Preferably, the data-maintenance method further comprises steps of: determining whether the latest version of the data is in a processor of the first node when the latest version of the data is not in the local memory of the first node; and requesting the latest version of the data via a system bus of the first node, and transferring the latest version of the data from the first node to the second node via the bus line when the latest version of the data is in the processor of the first node.

Preferably, a data transmission format on the bus line is the same as a data transmission format on the internal bus or the system bus.

In an embodiment, the step for determining whether the latest version of the data is in the local memory or the processor of the first node is performed according to a memory coherency directory.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is noted that the following descriptions of preferred embodiments of this invention are presented herein for purpose of illustration and description only; it is not intended to be exhaustive or to be limited to the precise form disclosed.

Figure 2:
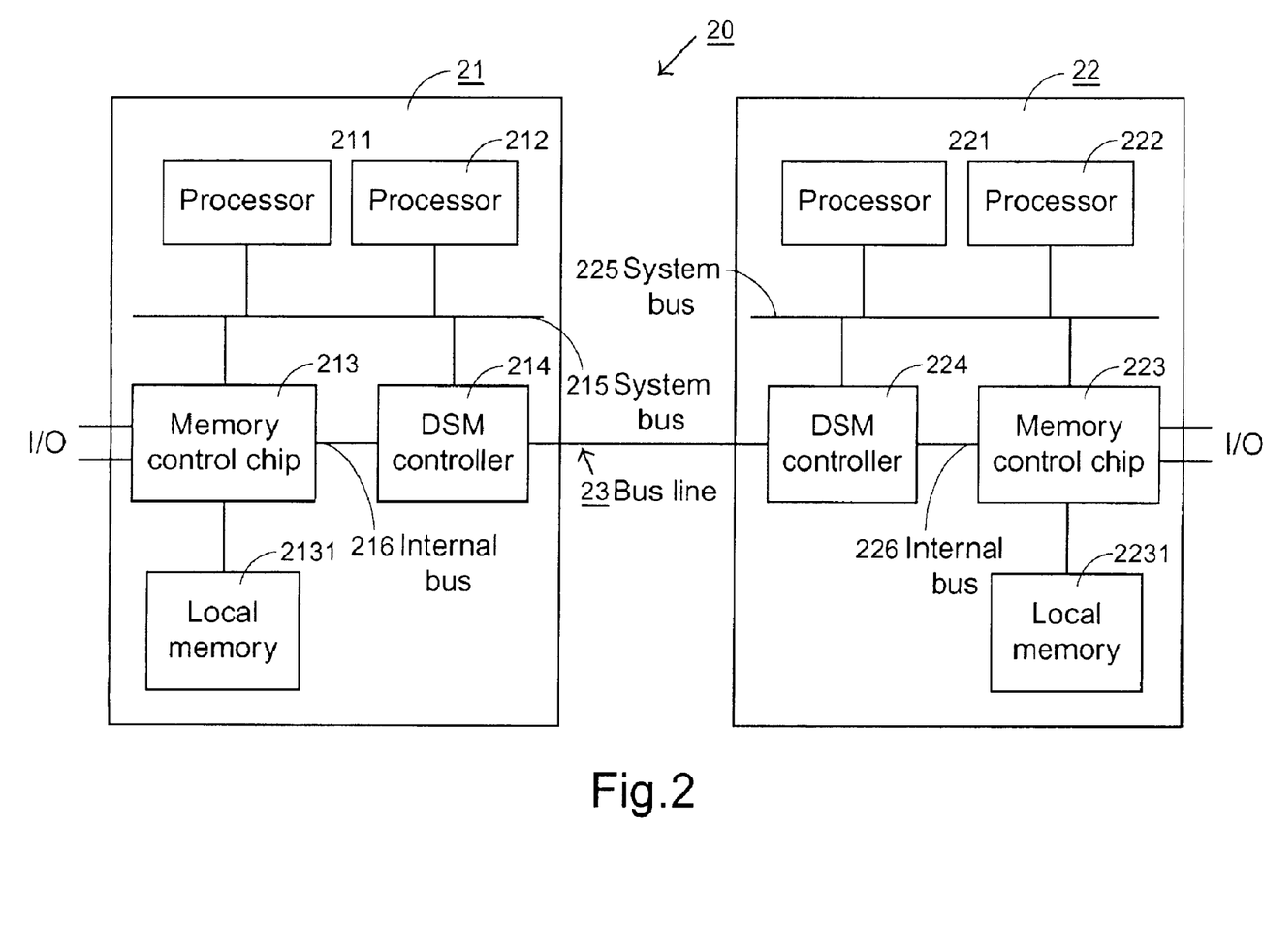
FIG. 2 is a block diagram showing a distributed shared memory (DSM) system according to a preferred embodiment of the present invention.

Please refer to FIG. 2, which is a block diagram illustrating a ccNUMA-type DSM system according to a preferred embodiment of the present invention. The DSM system 20 includes two nodes 21 and 22 interconnected by a bus line 23. The nodes 21 and 22, as shown, include respective processors 211, 212, 221, 222, memory control chips 213, 223 for I/O control, local memories 2131, 2231, DSM controllers 214, 224, system buses 215, 225, and internal buses 216, 226. Each of the local memories 2131, 2231 is divided into a plurality of local memory lines for separately storing data. The bus line 23 directly connects the DSM controllers 2114 and 224 via no network. Therefore, the communication between the nodes would be simple and efficient.

Figure 3:
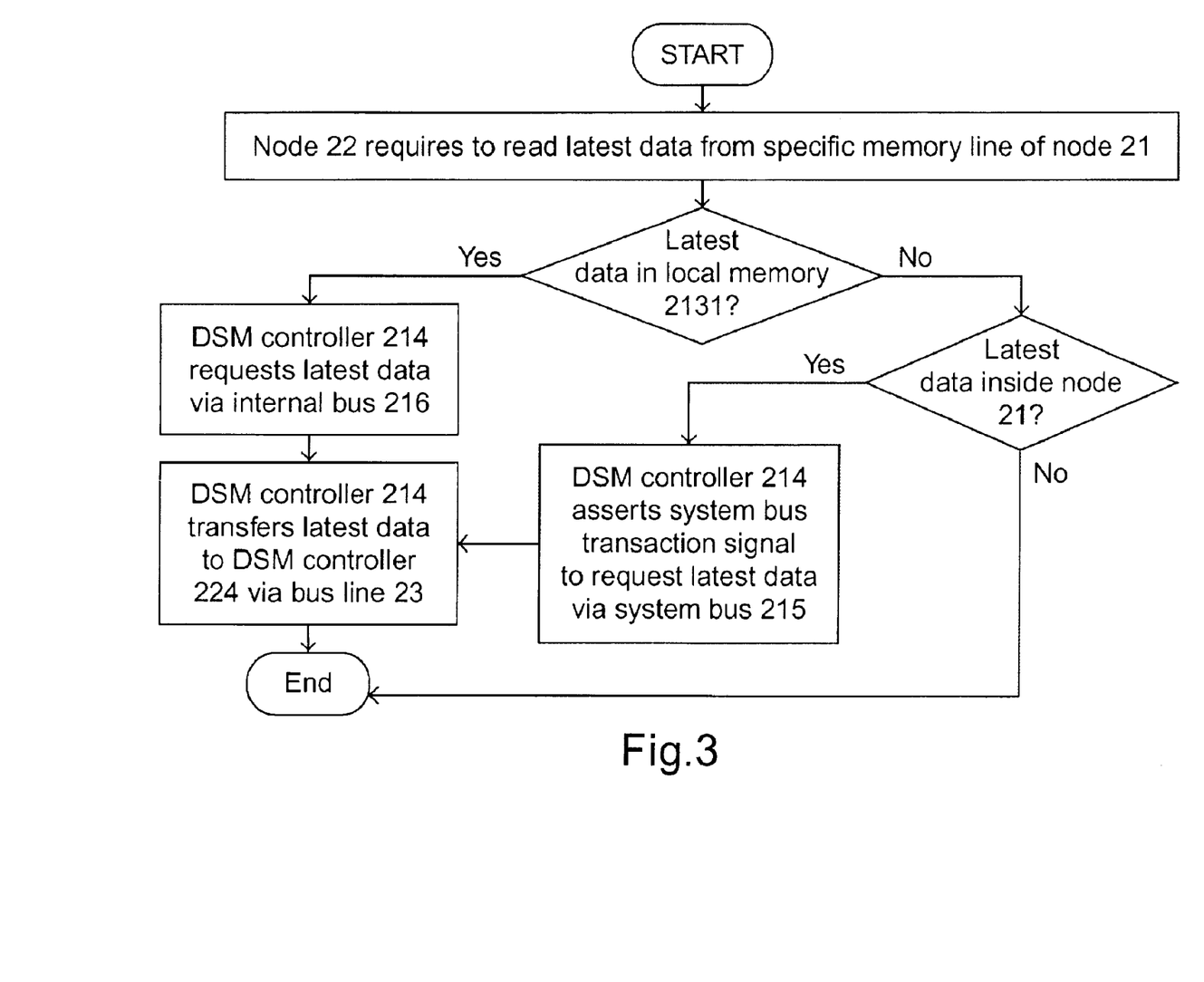
FIG. 3 is a flowchart of an embodiment of a data-maintenance method according to the present invention.

The data-maintenance method of the above DSM system will be described with reference to the flowchart of FIG. 3.

When the second node 22 requires to read data from a specific local memory line of the first node 21, the DSM controller 214 will determine where the latest data is by referring to a memory coherency directory 2141 stored therein. First, whether the latest data is in that specific local memory line is determined. If positive, the DSM controller 214 requests the latest data from the local memory 2131 via the internal bus 216 and transfers the data to the DSM controller 224 of the second node via the bus line 23. On the other hand, if the latest data is not in that specific local memory line, whether the latest data is in the cache of the processor 211 or 212 is determined. If positive, the DSM controller 214 requests the latest data from that processor via the system bus 215 by asserting a system bus transaction signal. The data is then transferred from the cache of that processor, through the DSM controller 214, to the DSM controller 224 of the second node via the bus line 23. In this embodiment, the data transmission format via the bus line 23 is identical to that of the internal bus 216 or system bus 215, thereby assuring of high transmission performance.

In order to demonstrate the data transmission of the present DSM system. The memory-state transition is illustrated with reference to FIGS. 4 and 5, which are state diagrams showing various states of a local memory line in response to a local access command and a remote access command, respectively.

Figure 4:
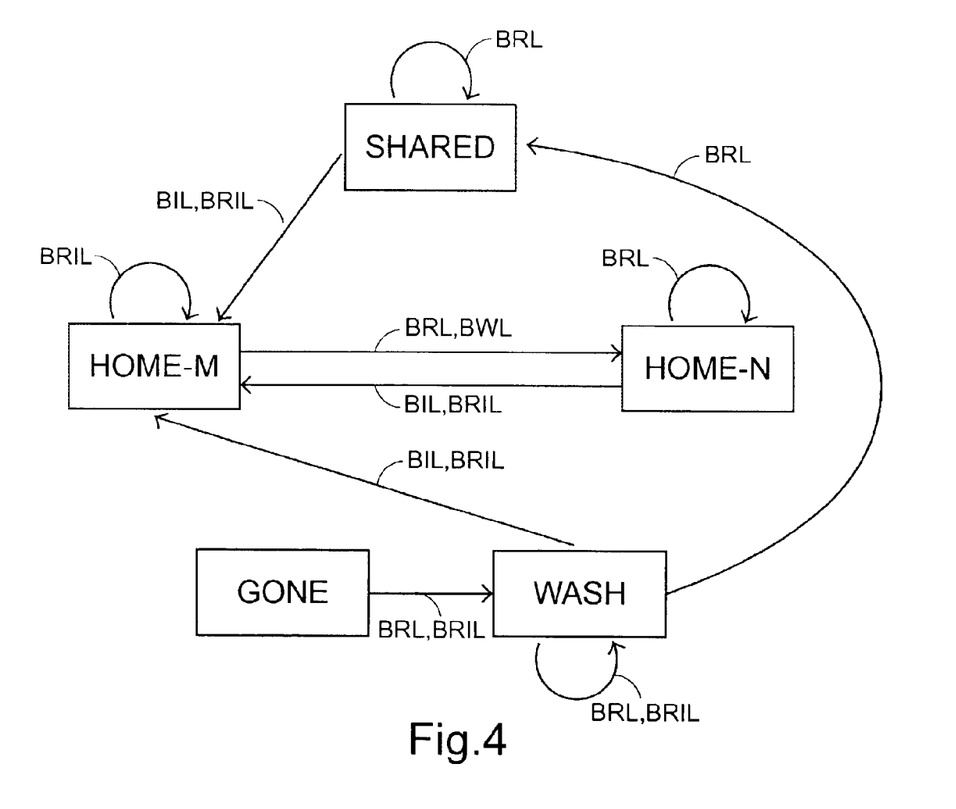
FIG. 4 is a state diagram showing various state of a local memory line in response to a local access command.

The DSM system as shown in FIG. 2 is used for illustrating the memory state transition. Please refer to FIG. 4. The state of each of the local memory lines indicated by the memory coherency directory 2141 includes HOME-M, HOME-N, SHARED, GONE and WASH states. The meanings of these states are described as follows:

HOME-N: The data from the local memory line is not read by any remote node, and the latest data is stored in the local memory;

HOME-M: The data from the local memory line is not read by any remote node, and the latest data is not stored in the local memory, but in the cache of a processor, i.e. L1 or L2 cache);

SHARED: The local memory was accessed by a remote node and the data in the local memory line is not revised by the remote node;

GONE: The local memory was accessed by a remote node and the data in the local memory line was revised by the remote node; and WASH: The data in the local memory was revised by a remote node and was being transmitted to the local node.

On the other hand, the local access command asserted by a local processor via the system bus is:

Local Bus Read Line (BRL): The command is issued to read a shared copy of data;

Local Bus Read Invalidate Line (BRIL): The command is issued to read an exclusive copy of latest data;

Local Bus Invalidate Line (BIL): The command is issued to revise a shared copy of latest data and exclusively own the latest data; or Local Bus Write Line (BWL): The command is issued to write latest data back to the local memory.

Hereinafter, the transition of the states is described by assuming the node 21 is a local node and the node 22 is a remote node. The initial state of the local memory line indicated by the memory coherency directory is HOME-N state. In HOME-N state, the latest data is stored in the local memory 2131 of the local node 21. When the processor 211 or 212 asserts a BRL command, it indicates the local processor 211 or 212 is going to read data from the local memory 2131, and the data is a shared copy for arbitrary access. Due to the latest data is still in the local memory 2131, the memory state of the local memory line remains in HOME-N.

In HOME-N state, when the local access command is BIL or BRIL, it is indicated that the processor 211 or 212 is going to read an exclusive copy of latest data or revise a shared copy of latest data and exclusively own the latest data. Therefore, the processor will invalidate the copy of the data stored in the local memory 2131. Therefore, the memory state of the local memory line in the memory coherency directory will change from HOME-N to HOME-M. HOME-M state indicates that the only valid copy of data is in the L1 or L2 cache of the local node 21.

In HOME-M state, when the local access command is BRIL, it is indicated that the processor 211 or 212 is going to revise a shared copy of data and exclusively own the latest data. Therefore, the processor will invalidate the copy of the data stored in the local memory 2131. Therefore, the only valid copy of data is in the L1 or L2 cache of the local node 21, and the memory state of the local memory line in the memory coherency directory remains in HOME-M state.

In HOME-M state, when the local access command is BRL or BWL, it is indicated that the latest data will be written from the cache of the processor 211 or 212 back to the local memory 2131. Therefore, the memory state of the local memory line in the memory coherency directory will change from HOME-M to HOME-N.

In SHARED state, the latest data is stored in both of the nodes 21 and 22. When the local access command is BRL, it is indicated the processor 211 or 212 may directly read data from the local memory 2131 of the local node 21. Therefore, the memory state of the local memory line in the memory coherency directory will remain in SHARED.

In SHARED state, when the local access command is BIL or BRIL, it is indicated that the processor 211 or 212 is going to read an exclusive copy of latest data or revise a shared copy of data and exclusively own the latest data. Therefore, the processor 211 or 212 will invalidate the copy of the data stored in the local memories 2131 and 2231 of both nodes 21 and 22. In other words, the only valid copy of the data will be in the cache of the processor 211 or 212. Accordingly, the memory state of the local memory line in the memory coherency directory will change from SHARED to HOME-M.

In GONE state, the latest data was accessed and revised by the remote node 22 and the valid copy is stored in the remote node 22. When the local access command is BRL, it is indicated the processor 211 or 212 is going to read a shared copy of latest data from the local memory 2131. Therefore, the latest data stored in the local memory 2231 of the remote node 22 should be transmitted back to the local node 21 to be read by the processor 211 or 212. Therefore, the memory state of the local memory line in the memory coherency directory will change from GONE to WASH. After the processor 211 or 212 has received the data, the memory state of the local memory line in the memory coherency directory will change from WASH to SHARED. In other words, the valid copy of the data is in both of the nodes 21 and 22 again.

In GONE state, when the local access command is BRIL, it is indicated that the processor 211 or 212 is going to revise a shared copy of data and exclusively own the latest data, and thus invalidate the copy of the data stored in the local memory 2131. Therefore, the latest data stored in local memory 2231 of the remote node 22 should be transmitted back to the local node 21 to be read and revised by the processor 211 or 212. Meanwhile, the latest data in the local memory 2231 of the remote node 22 is invalidated. Accordingly, the memory state of the local memory line in the memory coherency directory will change from GONE to WASH. After the processor 211 or 212 has received the data, the memory state of the local memory line in the memory coherency directory will change from WASH to HOME-M. In other words, the valid copy of the latest data will be in the cache of the processor 211 or 212.

In WASH state, when the local access command is BRL or BRIL, it is indicated that the memory state of the local memory line in the memory coherency directory is in a transition state, and will finally change to SHARED or HOME-M state in response to the BRL or BRIL command.

Figure 5:
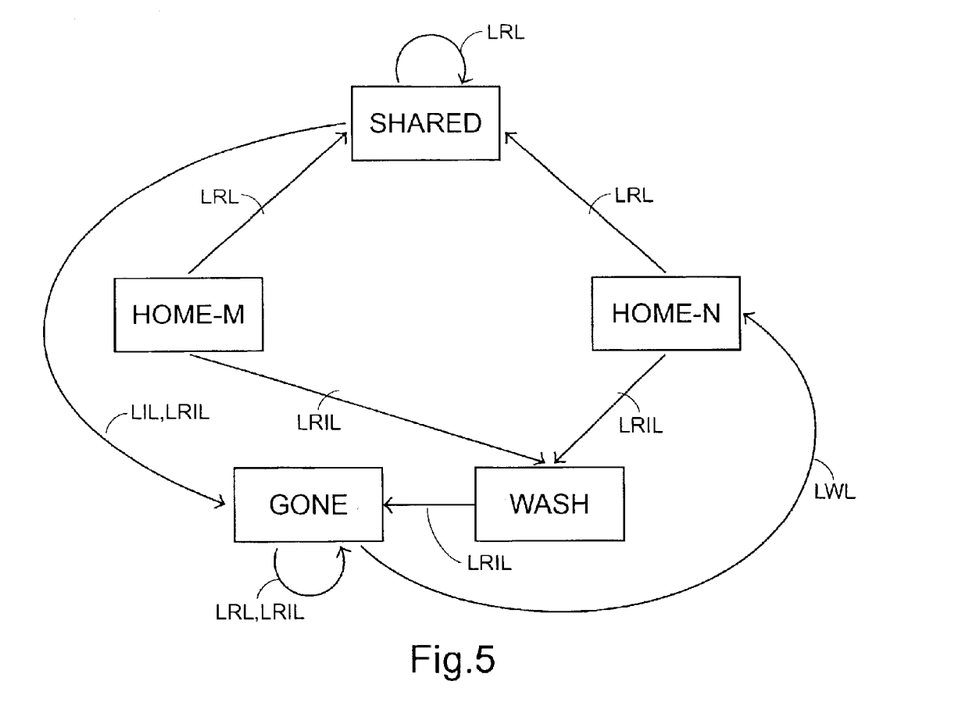
FIG. 5 is a state diagram showing various state of a local memory line in response to a remote access command.

Please refer to FIG. 5. The states of each of the local memory lines indicated by the memory coherency directory 2141 include HOME-M, HOME-N, SHARED, GONE and WASH states. The meanings of these states are the same as those described above. On the other hand, the remote access command asserted by a remote processor via the bus line 23 is:

Remote Read Line (LRL): The command is issued to read a shared copy of latest data;

Remote Read Invalidate Line (LRIL): The command is issued to read an exclusive copy of latest data;

Remote Invalidate Line (LIL): The command is issued to revise a shared copy of data and exclusively own the latest data; or Remote Write Line (LWL): The command is issued to write latest data back to the local memory.

Hereinafter, the transition of the state is described by assuming the node 21 is a local node and the node 22 is a remote node. The initial state of the local memory line indicated by the memory coherency directory is HOME-N state. In HOME-N state, the latest data is stored in the local memory 2131 of the local node 21. When the processor 221 or 222 of the remote node 22 asserts an LRL command, it indicates the remote processor 221 or 222 is going to read the latest data. The data should be transmitted to the remote node 22 to be read by the processor 221 or 222. Eventually, both the nodes 21 and 22 share the valid copy of the latest data. Therefore, the memory state of the local memory line changes from HOME-N to SHARED.

In HOME-N state, when the remote access command is LRIL, it is indicated that the processor 221 or 222 is going to read an exclusive copy of latest data. Therefore, the processor 221 or 222 will invalidate the data stored in the local memory 2131. The memory state of the local memory line in the memory coherency directory will change from HOME-N to WASH. After the processor 221 or 222 has received the data, the memory state of the local memory line in the memory coherency directory will change from WASH to GONE. In other words, the only valid copy of the latest data is the cache of the processor 221 or 222 of the remote node 22.

In HOME-M state, the latest data is stored in the cache of the processor 211 or 212 of the local node 21. When the processor 221 or 222 of the remote node 22 asserts an LRL command, it indicates the remote processor 221 or 222 is going to read the latest data. The data should be transmitted to the remote node 22 to be read by the processor 221 or 222. Eventually, both the nodes 21 and 22 share the valid copy of the latest data. Therefore, the memory state of the local memory line changes from HOME-M to SHARED.

In HOME-M state, when the remote access command is LRIL, it is indicated that the processor 221 or 222 is going to read an exclusive copy of the latest data. Therefore, the processor 221 or 222 will invalidate the data stored in the cache of the processor 211 or 212 of the local node 21. The memory state of the local memory line in the memory coherency directory will change from HOME-M to WASH. After the processor 221 or 222 has received the data, the memory state of the local memory line in the memory coherency directory will change from WASH to GONE. In other words, the only valid copy of the latest data is the cache of the processor 221 or 222 of the remote node 22.

In SHARED state, the latest data is stored in both the local and remote nodes 21 and 22. When the processor 221 or 222 of the remote node 22 asserts an LRL command, it indicates the remote processor 221 or 222 is going to read the latest data. Since the data is available for both nodes, the processor 221 or 222 can directly access the data. Therefore, the memory state of the local memory line remains SHARED.

In SHARED state, when the remote access command is LIL, it is indicated that the remote processor 221 or 222 is going to revise a shared copy of data and exclusively own the latest data. Therefore, the processor 221 or 222 will invalidate the data in the local node 21. The memory state of the local memory line in the memory coherency directory will change from SHARED to GONE. Accordingly, the only valid copy of the latest data is in the cache of the processor 221 or 222 of the remote node 22.

In GONE state, the latest data is stored in the remote node 22. When the remote access command is LRL or LRIL, it is indicated that the remote processor 221 or 222 is going to read a shared or an exclusive copy of latest data. Since the latest data has been in the remote node 22, the processor 221 or 222 can directly access the data. Therefore, the memory state of the local memory line remains GONE.

In GONE state, when the remote access command is LWL, it is indicated that the remote processor 221 or 222 is going to write latest data back to the local memory 2131 of the local node 21. Meanwhile, the copy of the data in the node 22 will be invalidated. Accordingly, the memory state of the local memory line in the memory coherency directory will change from GONE to HOME-N.

It is apparent from the above description that the DSM system according to the present invention can operate well by using a bus line to substitute for the complicated network structure between the two nodes. In addition, no L3 cache is required in the present system.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A distributed shared memory (DSM) system including a first and a second nodes, said first node comprising:
   a first system bus;
   at least one first processor electrically connected to said first system bus;
   a first memory control chip electrically connected to said at least one first processor via said first system bus;
   a first local memory electrically connected to said first memory control chip and including a plurality of first local memory lines for separately storing data; and
   a first DSM controller electrically connected to said at least one first processor via said first system bus, electrically connected to said first memory control chip via a first internal bus, and directly coupled to a second DSM controller of said second node via a bus line.

2. The DSM system according to claim 1 wherein said first DSM controller of said first node requests a latest data from a specific one of said first local memory lines via said first internal bus when said latest data required by said second node is stored in said first local memory.

3. The DSM system according to claim 2 wherein said first DSM controller of said first node transfers said latest data to said second DSM controller of said second node via said bus line.

4. The DSM system according to claim 3 wherein a data transmission format of said bus line is identical to that of said first internal bus.

5. The DSM system according to claim 1 wherein said first DSM controller of said first node requests a latest data from said at least one first processor via said first system bus by asserting a system bus transaction signal when said latest data required by said second node is stored in a cache of said at least one first processor.

6. The DSM system according to claim 5 wherein said first DSM controller of said first node transfers said latest data to said second DSM controller of said second node via said bus line.

7. The DSM controller according to claim 6 wherein a data transmission format of said bus line is identical to that of said first system bus.

8. The DSM system according to claim 1 wherein said first DSM controller is stored therein a memory coherency directory for recording the state of data in its local memory.

9. The DSM system according to claim 1 wherein said second node comprising:
   a second system bus;

at least one second processor electrically connected to said second system bus;

a second memory control chip electrically connected to said at least one second processor via said second system bus;

a second local memory electrically connected to said second memory control chip and including a plurality of second local memory lines for separately storing data;

a second internal bus; and said second DSDA controller electrically connected to said at least one second processor via said second system bus, to said local memory control chip via said second internal bus, and to said first DSM controller of said first node via said bus line.

10. A data-maintenance method of a distributed shared memory (DSM) system including a first and a second nodes, comprising steps of:

determining a position of a latest data in said first node, which is required by said second node; and transferring said latest data from said first node to said second node essentially via a bus line when said position of said latest data is determined, wherein said latest data is transferred from said first node to said bus line via a system bus or an internal bus, and a data transmission format of said bus line is identical to that of said system bus or said internal bus.

11. The data-maintenance method according to claim 10 wherein said position of said latest data is determined by referring to a memory coherency directory.

12. The data-maintenance method according to claim 10 wherein said latest data is transferred from said first node to said bus line via said internal bus when said latest data required by said second node is determined to be stored in a local memory of said first node.

13. The data-maintenance method according to claim 10 wherein said latest data is transferred from said first node to said bus line via said system bus when said latest data required by said second node is determined to be stored in a cache of a processor of said first node.

14. The data-maintenance method according to claim 13 wherein said latest data is transferred from said first node to said system bus in response to a system bus transaction signal.

15. A data-maintenance method of a distributed shared memory (DSM) system, said DSM system comprising a first and a second nodes which optionally request to read data from each other, said method comprising steps of:

determining whether a latest version of a data of a specific local memory line is in a local memory of said first node when said second node requests to read said data;

requesting said latest version of said data via an internal bus of said first node, and transferring said latest version of said data from said first node to said second node via a bus line directly connecting said first and said second nodes, when said latest version of said data is in said local memory of said first node;

determining whether said latest version of said data is in a processor of said first node when said latest version of said data is not in said local memory of said first node; and requesting said latest version of said data via a system bus of said first node, and transferring said latest version of said data from said first node to said second node via said bus line when said latest version of said data is in said processor of said first node.

16. The data-maintenance method according to claim 15 wherein a data transmission format on said bus line is the same as a data transmission format on said internal bus.

17. The data-maintenance method according to claim 15 wherein said step for determining whether said latest version of said data is in said local memory of said first node is performed according to a memory coherency directory.

18. The data-maintenance method according to claim 15 wherein a data transmission format on said bus line is the same as a data transmission format on said system bus.

19. The data-maintenance method according to claim 15 wherein said step for determining whether said latest version of said data is in said processor of said first node is performed according to a memory coherency directory.

* * * * *